United States Patent [19]
Greenberg et al.

[11] 4,280,809
[45] Jul. 28, 1981

[54] EDUCATIONAL TOY

[76] Inventors: Lawrence J. Greenberg, 64 Mountain Ave., Larchmont, N.Y. 10538; Gregory E. Hyman, 19 Sicard Ave., New Rochelle, N.Y. 10804

[21] Appl. No.: 9,872

[22] Filed: Feb. 7, 1979

[51] Int. Cl.³ .............................................. G09B 7/06
[52] U.S. Cl. ..................................... 434/343; 434/338
[58] Field of Search ............... 35/8 A, 9 R, 9 A, 9 B, 35/9 C, 9 D, 30, 31 R, 31 C, 35 A; 434/338, 343

[56] References Cited

U.S. PATENT DOCUMENTS

| | | | |
|---|---|---|---|
| 3,070,904 | 1/1963 | Saba | 35/9 C |
| 3,350,793 | 11/1967 | Bushnell | 35/9 B |
| 3,735,501 | 5/1973 | Ma | 35/9 C |
| 3,902,256 | 9/1975 | Liu | 35/9 D |
| 3,947,972 | 4/1976 | Freeman | 35/8 A |
| 4,000,565 | 1/1977 | Overby | 35/35 A |
| 4,001,948 | 1/1977 | Wolfe | 35/9 B |
| 4,010,556 | 3/1977 | Ellsworth et al. | 35/9 A |
| 4,165,325 | 9/1979 | Weber | 35/9 C |
| 4,173,832 | 11/1979 | Chen et al. | 35/9 B |

FOREIGN PATENT DOCUMENTS

| | | | |
|---|---|---|---|
| 659387 | 5/1965 | Belgium | 35/9 R |
| 2224056 | 10/1974 | France | 35/9 C |

OTHER PUBLICATIONS

"Touch-Me" Operating and Maintenance Manual; 1974, pp. 1-8.

Primary Examiner—Vance Y. Hum
Attorney, Agent, or Firm—Henry Sternberg

[57] ABSTRACT

An educational toy for testing a child's ability to properly associate logically related symbols and teaching proper associations. The toy includes an area for displaying two groups of symbols in a predetermined array on a housing and two members movably mounted to the housing so that the child may move each member into alignment with a symbol from one of the groups. In response to manual actuation of a switch, the toy emits a first signal, indicative of a correct performance, if the members are in alignment with logically related symbols at the time of such actuation and emits a second signal, indicative of incorrect performance, if the members are not so aligned at the time of such actuation. In a preferred embodiment, the toy includes electronic detection and signalling circuitry, a programmed microprocessor forms a part of the detection and signalling circuitry, and the microprocessor may be manually controlled to act in other play modes. The foregoing abstract should not be taken as a complete exposition of the present invention, or as a limitation of the present invention.

6 Claims, 9 Drawing Figures

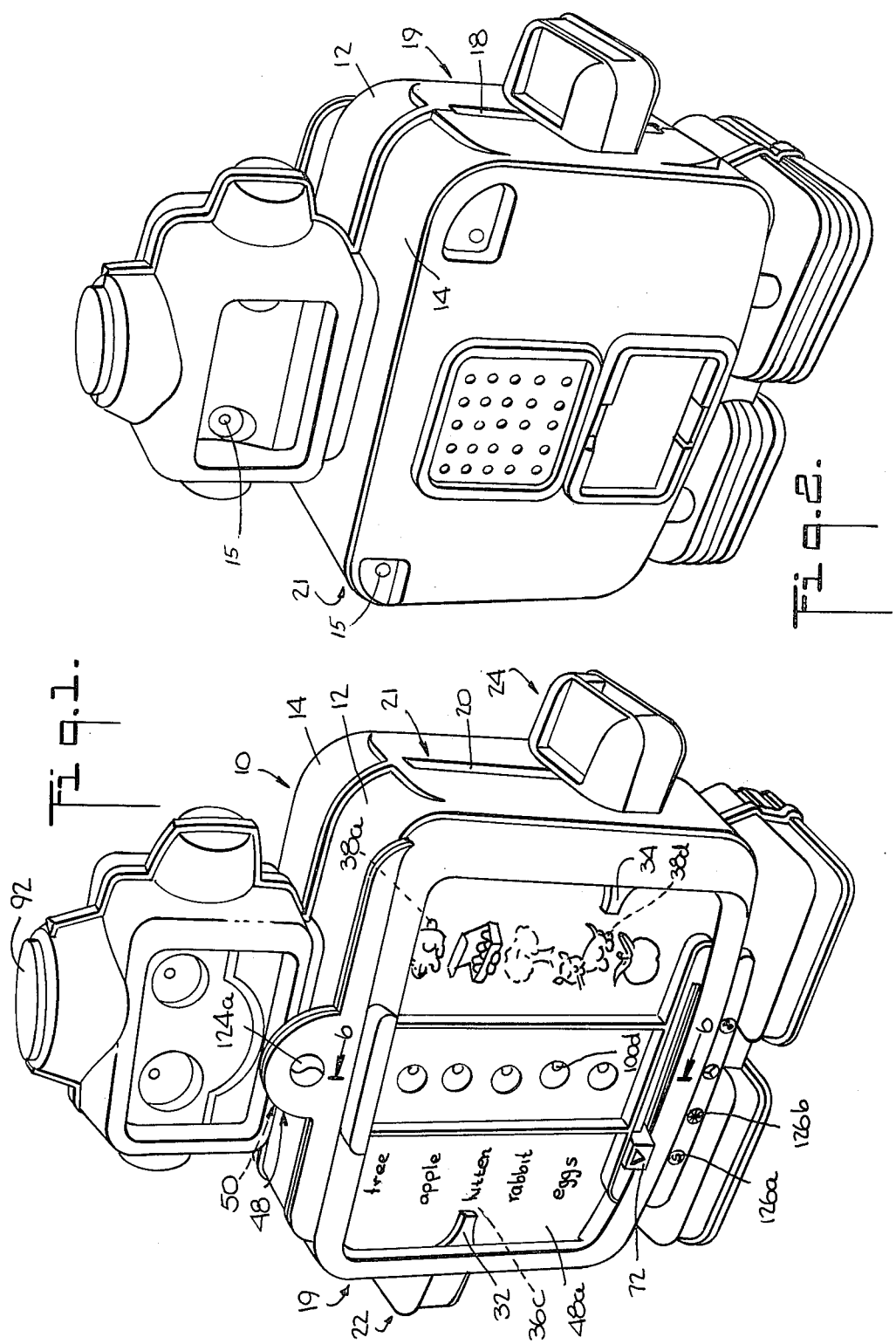

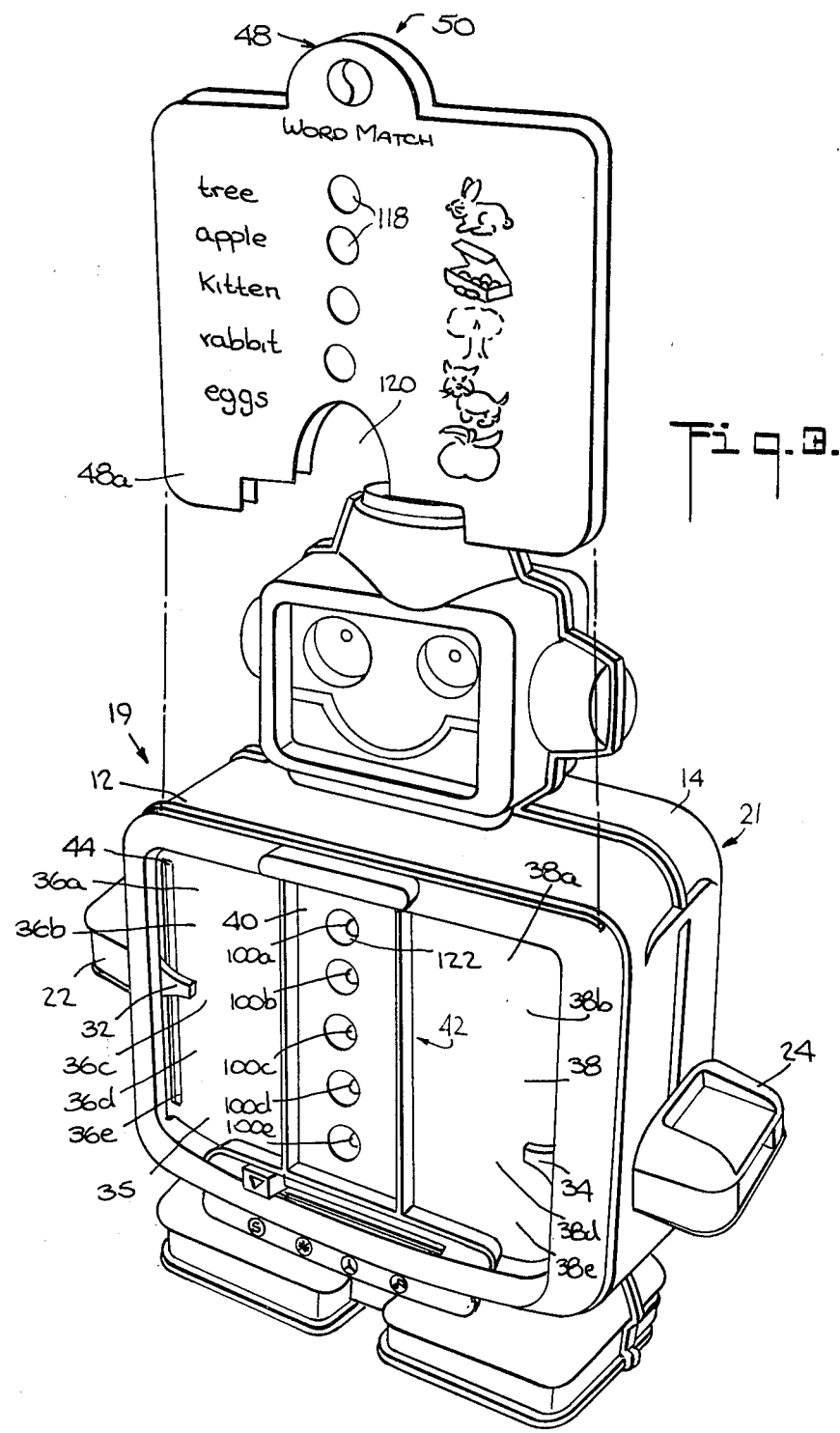

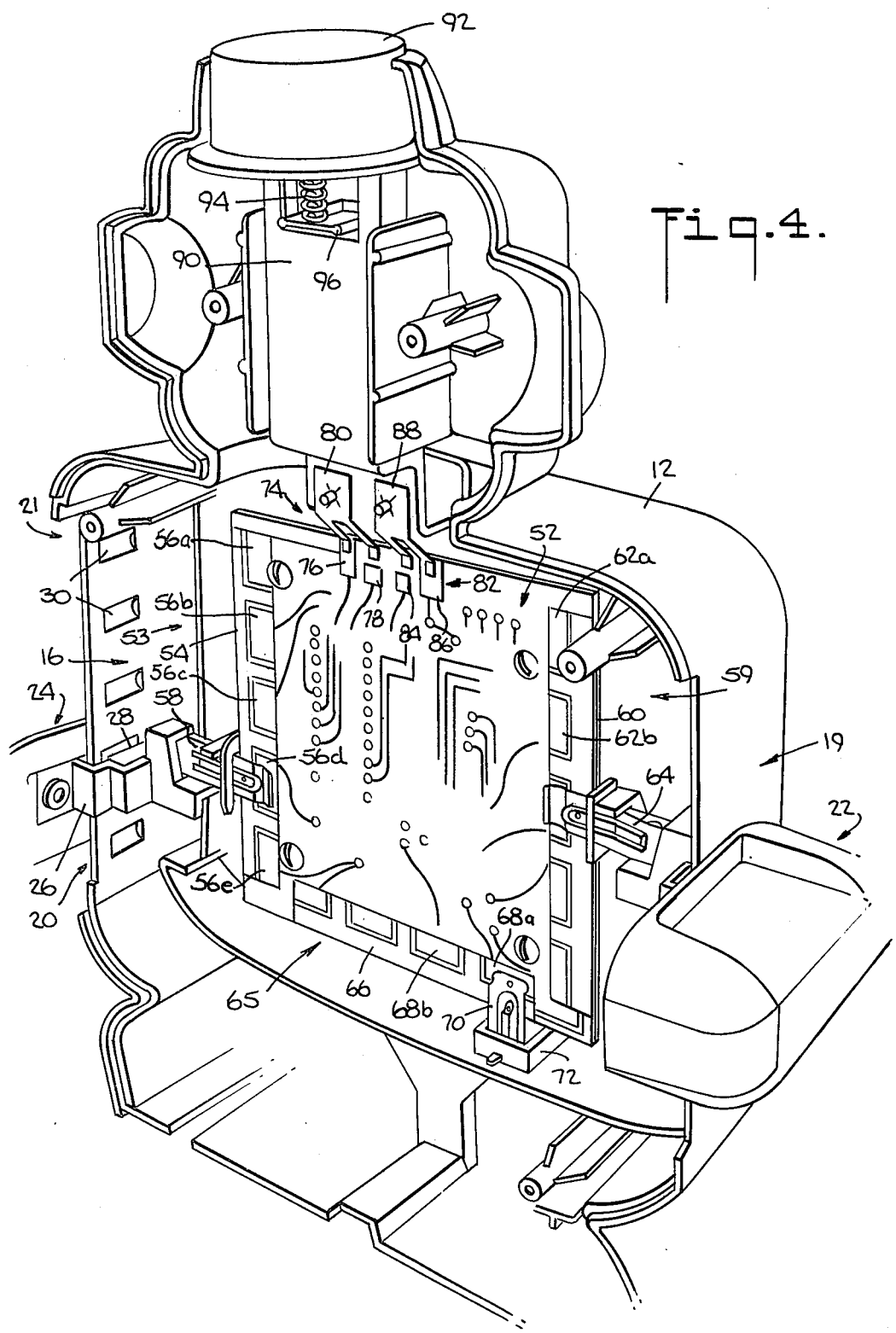

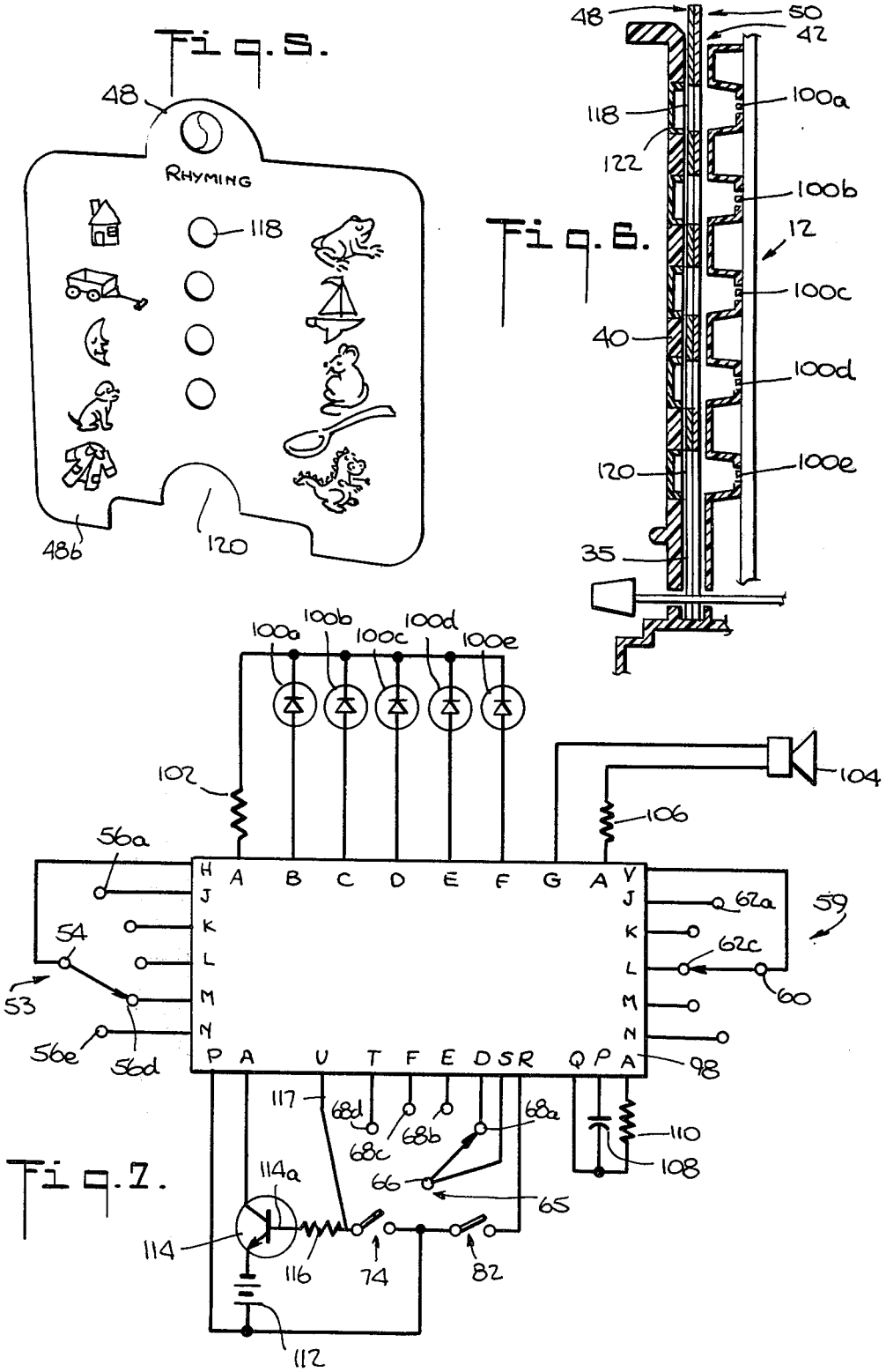

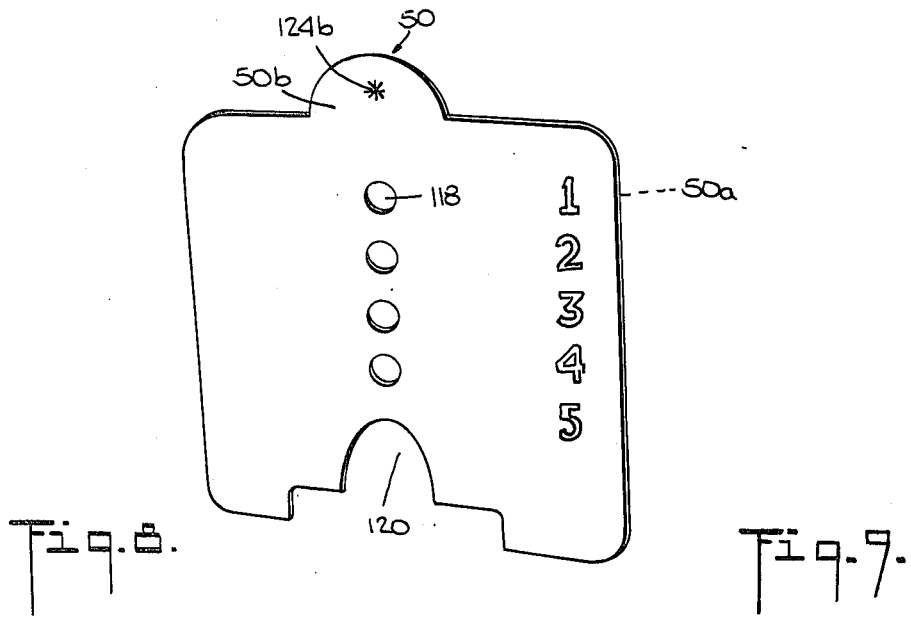

```
3E486821636AB80968683C0F120F2ABD806B6F126D0F661F3CF66F1845B58A72
006960503FC4D3201768460F6A62C24C4C2C12B5630480030C2A0F874C0E05B7
4A2826758AAE70BF8643046CA19CAC051C1F14234007B868C0461FDCFC471F0E
99037A10780A137008A995EB17211E6C43FC28C0701940611017034DCF0D2403
16C324160E7016C0890E449C02C389169305A2444507C08FB18A781611049DCF
00C30E9C7CA8221E187403167023482A164646AF84AEC0438E5009142080581E
6B6663666E696B666A6D006B82666A630069806600006B6F6E034663C16A6366
006161666BAA1B660017006A663C3F626E63136B6B636A0F623D6A686668626B
10C0C00363166B486B6210CF6369230E143D6D6B60AD101F700F6663821D1E04
801E6A8E666D624A61DB47D4FC6B5403B911C9600F1E660E4A40804ED40EBB38
10C0446368216D46660F6A9F6268106F17636A6CD3D12166AA62E60F68FCFF06
B2D868606D6D6CFF6D6A3F46126C661E10600F1E3DBD630D68DC7022104A034A
2FBF4648B260039F8C3A0C4A39080C441B3B89B9D3B798224AB921460F4AB823
9104B9407422B2246A781A02824A2256220D40214622032B2340224082030E4A
45680C47AC019B6C6040AAAE196F09646C0F890C436522A3A37D8D2A22A403BC
BB081F434512A6B360263C45585F4CBC0DA4890745B39E6058232C604F606143
4E21694364600F786F669469F03D23B999623F0F4814620F6010C5C56A40B774
006160666002E2B71B6AB24C606666506E649668EE3EF060606203650FB76ABB
20218021AA206B20654D462A6068072BAC3E636F7D214187AC616B640FBB3C0B
002A1D6064EB6E3CB0641A0A2C640B3C4D606C3C6CBB633C3E3C2C3C3C224F21
234FA30A2A452F212799B2AD992F7A4C009921200B774E2F9B03972F2F9C7C70
0071202F2B562A4A0F4D809C7E2C2FAD412F2BAE0A760E742F72464286977SB6
4F0362433F0F636062EE6662913D1307806BD6E1D56F6B636A62686A6B802DBB
006A6B6A626D1B6817681E8E626262BA660F6F2063606B256A076703078E686F
4E21C24DB8467474861D1D03999621BF1F19126B70AA803EC3691C1A1B12430E
8C1F7E1D7A6A7D409480181716974CC023806FFD72B57C15781E706168B77203
6B68666OOD653E686B2B14170F4CDF6CAC6AA4567C943F806B2A737DC2686262
006DA1606A03846B801C1A6A68161F6A6221446CAA68A46B463DC068630F636C
3C413C28210F8BBF031263791E11AE2063801D763C1A3DB43F8C80C0753A38AF
802146728063AA1B4668D7B0B0FC4E4924066A96403E1E21A23A98419D032820
400D4E10746478C01280166438A910601178CF1B48C36268608E131114DC1B50
A5C0AA402399AAB222162368408E0FBD10231878AC687C09CF0848D4C41E0F8F
```

EDUCATIONAL TOY

This invention relates to toys, and more particularly relates to educational toys which test a child's ability to perform a certain task.

It is an object of the present invention to provide a toy which tests a child's ability to select logically related symbols from among two sets of symbols, which emits a first signal if the child correctly chooses related symbols, and which emits a second, different signal if the child incorrectly chooses unrelated symbols. It is a further object of the present invention to provide a toy which is resistant to any efforts by the child to select related symbols by mere guesswork but which is inherently simple to operate, so that the only substantial difficulty in successfully operating the toy lies in the choice of the symbols themselves, rather than in the operation of the toy.

A toy according to the present invention includes a housing and a first member mounted on the housing so that the first member is selectively moveable between a plurality of discrete positions on the housing. These positions constitute a first set of positions. The toy also includes a second member which is also mounted on the housing and which is selectively moveable between a plurality of discrete positions on the housing. The positions for the second member constitute a second set of positions. Each position of the second set is associated with a position of the first set according to a predetermined pattern of association.

Means are provided for displaying a plurality of symbols of a first type and a plurality of symbols of a second type. Each symbol of the second type is logically related to one of the symbols of the first type. The symbols are displayed on the housing so that each one of the symbols of the first type is displayed on the housing in alignment with one of the positions of the first set, and each one of the symbols of the second set is displayed on the housing in alignment with one of the positions of the second set. Each symbol of the second type and the logically related one of the symbols of the first type are displayed in alignment with associated positions.

Thus, if the child selects a symbol of the first type and a logically related symbol of the second type, and then moves the members into alignment with such symbols, the members will lie in associated positions.

The toy also includes a switch which is manually actuable independently of the positions of the members, and detection and signalling means operatively associated with the switch. The detection and signalling means operate in an alignment testing mode to detect the positions of the first and second members. In response to actuation of the switch, the detection and signalling means emit a first operator perceivable signal if, at the time of such actuation, the first and second members are in associated positions, but emit a second operator perceivable signal different from the first signal if, at the time of such actuation, the first and second members are in non-associated positions.

Because mere correct positioning of the members in alignment with associated symbols does not trigger the first or "correct answer" signal, the child cannot obtain the correct answer signal merely by moving the first and second members back and forth among their respective positions. Rather, the child is forced to select what he considers to be associated symbols, align the members with these symbols, and then actuate the switch to see if he has made a correct choice. This requirement that the child take the additional step of actuating the switch makes it substantially more difficult for a young child to guess his way to a correct answer, but does not materially increase the mechanical skill needed to operate the toy. Therefore the toy provides a fair test of the child's ability. Since the test is more challenging, the psychological reqard to receiving the first signal, indicative of a correct choice is increased, which makes it more rewarding for the child to recieve the correct answer signal. Therefore, the child is given greater encouragement to learn the correct association between symbols.

In the preferred embodiment, the toy also includes output means operatively associated with the detection and signalling means. This output means emits a third operator perceivable signal in the event that the switch is actuated while the first and second members are in non-associated positions. This third signal is indicative of the position of the second set which should have been chosen for correct alignment. Thus, if the child chooses unrelated symbols, the toy will indicate which symbol of the second type should have been chosen.

In the preferred embodiment, the symbols are displayed on interchangeable cards, and means are provided for holding such cards in to the housing so that the symbols lie in proper registration. This arrangement permits different symbols to be displayed on the same toy, so that the educational content of the toy can be varied simply by changing the cards.

Preferably, the detection and signalling means within the toy is also operable in modes other than the "alignment testing" mode described above. Such modes may include a randomizing mode so that the toy can serve as the randomizing element of a game, or a count mode in which the toy tests the child's ability to count signals and select a numerical symbol symbolizing the number of such signals. If the detection and signalling means are arranged to emit some of the aforementioned signals in the form of audible tones, the detection and signalling means may also be operable in a music-generating mode to emit a series of audible tones which form a melody.

If the detection and signalling means are operable in a number of different modes, manually operable control means are provided for causing the detection and signalling means to operate in the mode selected by the child. As can be appreciated, the detection and signalling means incorporate substantial mechanized logic. Preferably, the detection and signalling means includes an electonic microprocessor.

BRIEF DESCRIPTION OF THE DRAWINGS

FIG. 1 is a perspective view of a toy in accordance with the preferred embodiment of the present invention.

FIG. 2 is a further perspective view of the toy depicted in FIG. 1.

FIG. 3 is a perspective view similar to FIG. 1 but depicting the toy in a different position.

FIG. 4 is a perspective view of the toy depicted in FIG. 1 with the rear portion of the toy removed.

FIG. 5 is a perspective view of one of the cards depicted in FIGS. 1 and 3.

FIG. 6 is a partial sectional view taken along the plane indicated by line 6—6 in FIG. 1.

FIG. 7 is a schematic electrical circuit diagram of the toy depicted in FIG. 1.

FIG. 8 is a perspective view of another one of the cards depicted in FIGS. 1 and 3.

FIG. 9 is a representation of a program for the microprocessor depicted in FIG. 7.

DETAILED DESCRIPTION OF THE PREFERRED EMBODIMENT

As shown in FIGS. 1 and 2, a toy according to the preferred embodiment of the present invention has a housing 10 which includes a front piece 12 and a rear piece 14 fastened together by screws 15. These pieces are generally hollow, so that they define an interior cavity 16 (FIG. 4). As shown in FIGS. 1 and 2, the front piece 12 and the back piece 14 cooperatively define a slot 18 on a first side 19 of the housing and a slot 20 on a second, opposite side 21 of the housing.

A first member 22 is movably mounted to the housing on the first side 19, and a second member 24 is movably mounted to the housing on the second side 21. As shown in FIG. 4, the second member 24 includes a portion 26 which extends into the housing through the second slot 20. This portion 26 holds the member 24 to the housing but allows it to slide along the side of the housing, upwardly and downwardly as shown in FIG. 4. The member 24 also includes a cantilever spring 28 which is constructed and arranged to engage any one of a plurality of depressions 30 formed in an interior surface of the front piece 12. Thus, the second member 24 can be moved between a plurality of discrete positions, each such position corresponding to the engagement of the cantilever spring 28 with one of the depressions 30. A similar arrangement is provided on the first side of the housing for the first member 22, so that it also may be moved into any one of a plurality of discrete positions.

As shown in FIGS. 1 and 3, the members 22 and 24 include respective pointer portions 32 and 34. As described above, the first member 22 is movable between the first set of positions and the second member 24 is movable between a second set of positions. In each position of the member 22, its pointer portion 32 is aligned with a corresponding portion of the front surface 35 of the housing. These portions are denominated in FIG. 3 by reference characters 36a through 36e. Likewise, in each position of the second member 24, its pointer portion 34 is in alignment with one of the portions 38a through 38e of the front surface 35. Throughout the remainder of this disclosure, the positions of each member during the operation of the device will be identified by identifying the surface portion with which the pointer portion of that member is aligned. For example, the member 22 may be said to be "in position 36c", and this should be understood to mean that the member 22 is in a position wherein its pointer portion 32 is aligned with the surface portion 36c of front surface 35.

Each one of the positions 38 of the second set of positions is associated with one of the positions 36 of the first set according to a predetermined pattern. As will be described below, the pattern of association is determined by the arrangement of electrical elements within the housing 10. However, such pattern of association is fixed for any given toy. In the embodiment illustrated, the pattern of association is as shown by Table I, wherein each position of the second set is enumerated on the same line as the associated position of the first set.

TABLE I

| Position of First Set | Position of Second Set |
|---|---|
| 36a | 38c |
| 36b | 38e |
| 36c | 38d |
| 36d | 38a |
| 36e | 38b |

As shown in FIG. 3, each position of the second set is aligned with a position of the first set which is not associated with that position of the second set, and each position of the second set is remote from the position of the first set which is associated with that position of the second set. For example, position 38c of the second set is physically aligned, on the front surface 35 of the housing, with position 36c of the first set, but position 36c is not associated with position 38c. Position 38c is physically remote from position 36b, which is associated with position 38c.

The positions of the second set are arranged in pseudorandom order with respect to the associated positions of the first set. That is, there is no readily apparent order to the association of the positions. Therefore, the child cannot readily learn the correct association of positions and defeat the purpose of the toy by aligning the members in associated positions without relying on the symbols. A pattern of association may be considered to be pseudorandom, as the term is used in this disclosure, if an adult of average intelligence cannot discern the associations of all of the positions, without the use of any symbols to guide him, in less than five minutes of practice. As can be appreciated, a child will require considerably more time to discern such association.

As shown in FIGS. 3 and 6, the front piece 12 of the housing includes a central strip 40 which overlies a medial region of the front surface 35, but which is spaced therefrom to define a narrow channel 42 behind the central strip but in front of the front surface 35. The front piece 12 also includes a side rail 44 which projects forwardly of the front surface 35 adjacent to the first side 19 of the housing, and a similar side rail (not shown) adjacent to the second side 21 of the housing. As shown in FIG. 6 the front piece 12 also includes a bottom lip 49 which projects forwardly of the front surface at the bottom of that surface.

Thus, cards 48 and 50 may be received in the slot 42. So long as the toy is held right side up (the position illustrated in FIGS. 1 and 3), the cards will remain affixed to the housing. The side rails will prevent the cards from moving sideways along the front surface, and the center strip 40 will prevent the cards from moving outwardly from the front surface. The bottom lip 49 (FIG. 6) supports the cards so that they cannot move vertically. Thus, the cards will be maintained in a predetermined relationship with the housing. However, as shown in FIG. 1, the cards project upwardly from the housing. Thus, they may be removed from the channel 42 merely by grasping the projecting portions and pulling upwardly on them. Once the cards have been removed from the channel 42, they may be interchanged or inverted so that their surface of any one of the cards can be exposed on the front surface of the housing.

As shown in FIG. 1, the first surface 48a of card 48 is exposed. This surface has a plurality of symbols of a first type and a plurality of symbols of a second type on it. In the embodiment illustrated, each symbol of the first type is a single word, and each symbol of the second type is a picture illustrating the meaning of one of those words. Thus, each symbol of the second type is logically related to one of the symbols of the first type. For example, the picture of the kitten is logically related to the word "kitten". Of course, such logically related symbols can take almost any form. As shown in FIG. 5, the second surface 48b of card 48 has all pictorial symbols. The symbols of the first type are pictures, each one of which symbolizes a particular word. The symbols of the second type are also pictures. Each one of these pictures symbolizes a word which rhymes with the word symbolized by a particular one of the pictures of the first type. Thus, the picture of a house symbolizes the word "house" and the picture of a mouse symbolizes the word "mouse". Therefore, the picture of the mouse is logically related to the picture of the house. The first surface 50a of card 50 (FIG. 8) also has logically related symbols (not shown) printed thereon.

As set forth above, each position 38 of the second set is associated, according to a predetermined pattern, with one of the positions 36 of the first set. The patterns in which the symbols are arranged on the cards are so selected that, whichever one of card surfaces having symbols of said first and second types is exposed, each symbol of the second type on such surface is displayed in alignment with one of the positions 38 of the second set and the logically related symbol of the first type is displayed in alignment with the position 36 of the first set which is associated with that position of the second set. For example, as shown in FIG. 1, the picture of a kitten, which is a symbol of the second type, is displayed in alignment with the position 38d, while the word "kitten", which is the logically related symbol of the first type, is displayed in alignment with 36c of the first set. Position 36c is associated with position 38d. Therefore, if the child correctly associates the word "kitten" and the picture of a kitten, positions the first member 22 so that its pointer portion 32 points to the word "kitten", and positions the second member 24 so that its pointer portion 34 points to the picture of a kitten, the first and second members will be in associated positions.

Thus, whenever the child operating the toy correctly picks the logically related symbols, the members will be in associated positions; when the child incorrectly picks symbols which are not logically related, the members 22 and 24 will be in non-associated positions. After the child has positioned the members 22 and 24 in what he considers to be associated positions, he may depress the pushbutton 92 on the top of the toy to actuate a switch. Upon such actuation, detection and signalling means within the toy will emit a first signal (preferably a first series of audible tones) indicative of correct association if the members are in associated positions, and will emit a second signal different from the first signal, to indicate incorrect association if the members are in non-associated positions.

While the arrangement described above facilitates learning by informing the child as to whether or not he has correctly associated the symbols, it is desirable to further facilitate learning by providing a third signal to lead the child towards a correct association in the event that he makes an incorrect association. Output means for emitting this third signal are provided in the form of visual indicators or light emitting diodes 100.

As shown in FIGS. 1, 3 and 6, these light emitting diodes are mounted on the front piece 12 of housing 10. Each one of these light emitting diodes is mounted to the housing in alignment with one of the positions of the second set. Thus, diode 100a is mounted in alignment with position 38a, diode 100b is mounted in alignment with position 38b and so on. Although the cards 48 and 50 are positioned in front of the diodes 100, holes 118 and cut outs 120 in the cards 48 and 50 allow the diodes to be seen from the front of the device through lenses 122 mounted on the central strip 40. Because the holes and cutouts lie in the medial region of the cards, and each card is substantially symmetrical about an axis extending vertically through its medial region, the holes and cutouts will overlie the diodes even if the cards are reversed.

As will be described below, in the event that the child depresses the pushbutton and actuates the switch while the members 22 and 24 are in non-associated positions, the detection and signalling means will actuate the appropriate diode to indicate the position of the second set which should have been chosen for correct association. For example, if the first member 22 is in position 36c so that it is aligned with the word "kitten" (FIG. 1) and the second member 24 is in a position other than position 38d, the members are in non-associated positions. If the switch is actuated while the members are so positioned, the detection and signalling means will actuate the diode 100d. Because this diode is aligned with position 38d, it will emit a pulse of light in alignment with position 38d. This will indicate to the child that he should have chosen the picture of the kitten, displayed at position 38d.

The electronic components within the housing are arranged as depicted in FIGS. 4 and 7. As shown in FIG. 4, a printed circuit board 52 is mounted within the interior cavity 16 of the housing. This printed circuit board includes a multiple position switch 53 which has a printed common element or bus bar 54 and a plurality of printed contact pads 56 adjacent to the bus bar 54 but electrically insulated therefrom. An electrical contact element 58 is affixed to the second member 24, and is constructed and arranged to electrically connect one of the pads 56 to the bus bar 54. The particular pad which is connected to the bus bar will depend upon the position of the member 24. Thus, in the position illustrated, (wherein the member 24 is in position 38d) the electrical contact element 58 connects the pad 56d with the bus bar 54. If the member 24 were moved to the position 38b, the contact element 58 would connect the pad 56b with the bus bar 54. Thus, the multiple position switch 53 is operatively associated with the second member 24. A similar arrangement of common element or bus bar 60, contact pads 62, and contact element 64 constitutes another multiple position switch 59 which is operatively associated with the first member 22 in a like manner. When the first member 22 is in position 36a, the common element 60 is connected to contact pad 62a; when the first member 22 is in position 36b, the common element 60 is connected to the contact pad 62b, and so on.

A third multiple position switch 65 is provided along the bottom of the circuit board 52. This switch includes bus bar 66, contact pads 68 and contact element 70. The contact element 70 is linked to an arm 72 which protrudes through the front surface of the housing, as shown in FIG. 1. The arm 72 is manually movable between any one of four positions. When the arm 72 is moved to any one of these positions, the contact element 70 will electrically connect a corresponding one of the contact pads 68 to the bus bar 66.

A pair of momentary switches are provided at the top of the printed circuit board. Momentary switch 74 includes a pair of contact pads 76 and 78 and a contact element 80. Momentary switch 82 includes a pair of contact pads 84 and 86 and contact element 88. The contact elements 80 and 88 are both affixed to an electrically insulating element 90 which is slidably mounted to the front piece 12 of the housing. The slidable element 90 includes a push button 92, which protrudes upwardly through the top of the housing. This slidable element 90 is biased upwardly by a compression spring 94, which is mounted so that one of its ends bears on the underside of the slidable element and the other one of its ends bears on a boss 96 which is formed integrally with the front piece 12 of the housing. Therefore, the slidable element 90 will normally stay in the position depicted in FIG. 4. In this position, the contact elements 80 and 88 do not electrically connect the contact pads with which they are associated. However, when the operator depresses the push button 92, he can momentarily force the slidable element 90 downwardly until contact element 80 connects pad 76 with pad 78, and contact element 88 connects pad 84 with pad 86. Thus, the two momentary switches 74 and 82 are normally open, and are mechanically linked for simultaneous operation.

The electrical components of the device, including the switches described above, are shown schematically in FIG. 7. These electrical components include a Texas Instruments Model TMS 1000 microprocessor 98, which is available commercially from Texas Instruments, Inc., P.O. Box 1443, Houston, Tex. 77001. Such microprocessors include a plurality of exposed terminals which are sequentially numbered, starting with the number "1", by the manufacturer. The connections of the various elements to these terminals are indicated by the letters on the block representing the microprocessor 98 in FIG. 7 and by Table II, below. Thus, for example, the contact pad 56a of multiple position switch 53 is schematically depicted as being connected to the microprocessor at letter "J". As indicated in Table II, the letter "J" signifies connection to the terminal of the microprocessor which bears the manufacturer's number "22".

TABLE II

| SYMBOL IN FIG. 7 | TERMINALS(S) OF MICROPORCESSOR (MANUFACTURER'S DESIGNATION) |
| --- | --- |
| A | 9 and 4* |
| B | 27 |
| C | 28 |
| D | 1 |
| E | 2 |
| F | 3 |
| G | 10 through 17* |
| H | 7 |
| J | 22 |
| K | 23 |
| L | 24 |
| M | 25 |
| N | 26 |
| P | 20 |
| Q | 9 and 18* |
| R | 5 |
| S | 8 |
| T | 4 |
| U | 21 |
| V | 6 |

*Indicates terminals connected in common.

The other electrical components include the light emitting diodes 100a through 100e, which are connected to the microprocessor 98 through a common resistor 102 and a loud speaker 104 which is connected to the microprocessor through a resistor 106. A damped resonant network consisting of a capacitor 108 and a resistor 110 is also connected to the microprocessor 98. These elements, along with the multiple position switches 53 and 59 are included in the "detection and signalling means" of the device; the function of this detection and signalling means will be described below.

The momentary switch 82 is directly connected to the microprocessor. The battery 112, a power source means for supplying electrical energy, is connected to the microprocessor through the transistor 114. The base of this transistor is connected to the microprocessor through a resistor 116, and it may also be connected, through the resistor 116 and momentary switch 74, to the positive terminal of the battery 112. The multiple position switch 65, which is directly connected to the microprocessor 98, serves as a manually operable control means and controls the detection and signalling means so that it will operate, as described below, in the mode chosen by the operator.

As will be appreciated, the action of the microprocessor will be controlled by the program which is written into its "read only memory" at the time of its manufacture. Such programs, which can be generated by those skilled in the art of microprocessor programming, are written in the so called "machine language" of the particular microprocessor utilized. For the Texas Instruments TMS 1000 microprocessor used in the preferred embodiment of the present invention, the sequence of hexadecimal numbers set forth in FIG. 9 represents the correct machine language program to cause the microprocessor to perform the necessary functions and enable the detection and signalling means to operate in the manner described in this disclosure. It will be readily appreciated by those skilled in the electronic arts that the exact program to be utilized in any microprocessor in the toy of the present invention will depend upon the internal structure of the microprocessor itself and the choice of connections for the various electronic elements of the toy.

The function of the detection and signalling means will be described here only with reference to its so called "alignment testing" mode; other modes of operation will be described below. However, the detection and signalling means will operate in the alignment testing mode when the multiple position switch 65 is in the position shown in FIGS. 4 and 7; its common element 66 is connected to its contact pad 68a.

When the detection and signalling means is operative in the alignment testing mode, and the battery is supplying electrical energy to the microprocessor through the transistor 114, logic means including the multiple position switches 59 and 53 and elements of the microprocessor 98, operating according to the program of the microprocessor, will detect the positions of the first and second members 22 and 24, and will determine whether they are in associated positions or in non-associated positions. For example, as shown in FIGS. 1 and 7, the first member 22 is in position 36c, so that the common element of multiple position switch 59 is connected to the contact pad 62c of that switch. The second member 24 is in position 38d, and the common element 54 of multiple position switch 53 is connected to the contact pad 56d of that switch. The microprocessor can therefore determine the positions of the elements by proceeding, according to its program, to check which one of its terminals are connected to each other through the multiple position switches.

If the multiple position switches 53 and 59 are in the states shown in FIG. 7, or are in any other states characteristic of the members 22 and 24 being in associated positions and the child depresses the pushbutton 92 (FIG. 4) to close the momentary switch 82, the microprocessor will cooperate with the resistor 110 and the capacitor 108 to produce a first sequence of audio frequency electrical signals, and will route these audio frequency electrical signals to the loudspeaker 104. The loudspeaker will convert these signals into a first series of audible tones. Together, such audible tones constitute a first operator perceivable signal. Preferably, this signal is in the form of a sequence of pleasant, musical notes, which serve as a further reward to the child using the toy for having correctly associated symbols and positioned the members 22 and 24 accordingly, and for having the courage of his convictions to assert that he has chosen correctly associated symbols by pressing the push button 92 to close the momentary switch 82.

If the members 22 and 24 are in non-associated positions, the logic means will detect such non-association in a similar manner. If the child depresses the push button 92 and thereby actuates the switch 82 while the members 22 and 24 are in non-associated positions, the microprocessor 98, capacitor 108 and resistor 110 will produce a second sequence of audio frequency signals different from those described above. The loudspeaker 104 will therefore produce a second series of audible tones, different from the first series of audible tones described above. This second series of audible tones will constitute a second operator perceivable signal different from the first operator perceivable signal. Preferably, this second operator perceivable signal consists of unpleasant tones.

If the momentary switch 82 is actuated while the members 22 and 24 are in non-associated positions, the microprocessor will also proceed, according to its program, to select the appropriate one of the light emitting diodes 100 and actuate that diode by routing electrical energy to it. As described above, the appropriate one of the light emitting diodes to be actuated in such a situation is the diode which is aligned with the position of the second set which is associated with the position of the first set in which the first member 22 was positioned at the time the switch 82 was actuated.

The battery or power source means 112 is connected to the microprocessor by way of the transistor 114. The transistor will only conduct electricity if a positive voltage is applied to its base lead 114a. When the pushbutton 92 (FIG. 4) is depressed, and the momentary switch 74 is closed, the positive voltage of the battery is momentarily applied to the base lead 114 of the transistor by way of the resistor 116. Therefore, the transistor will momentarily be in a conducting mode and will momentarily connect the battery 112 to the microprocessor 98 of the detection and signalling means.

After the pushbutton is released and the momentary switch 74 opens, the transistor 114 will continue to conduct only for so long as positive voltage from the battery is applied to its base lead 114a by the microprocessor 98 through lead 117. The microprocessor is programmed to measure time by counting oscillations of the resonant circuit (the capacitor 108 and resistor 110) and continue applying such voltage to the transistor for a predetermined period of time after the momentary switch 74 opens. The microprocessor is also programmed to detect any actuation of the switch 82 and to detect any change in state of the switches 53 and 59 which would occur upon movement of the members 22 and 24 (FIG. 1), and to restart the predetermined period of time upon any such actuation or movement. Thus, the transistor will continue to connect the battery to the microprocessor for a predetermined period of time after:

(a) the termination of the momentary connection by the opening of the switch 74, or (b) the last movement of one of the members 22 or 24, or the last actuation of the switch 82, whichever last occurs. At the end of such a predetermined period, the transistor will stop conducting and the microprocessor will be electrically isolated from the battery. Thus, if the child using the toy stops playing with it for too long a time, the toy will shut itself off and save its batteries.

Aside from the "alignment-testing" mode of operation described above, the toy according to the preferred embodiment of the present invention can also be utilized in a "count mode", which tests the child's ability to count audible signals. To utilize the toy in the count mode, the cards 48 and 50 (FIG. 1) are interchanged so that the second surface 50b (FIG. 8) of card 50 is exposed on the front surface of the housing 10. Thus, the predetermined numerical symbols on this surface will be displayed in alignment with the position 38 of the second set according to a predetermined pattern. For example, the symbol "1" will be displayed in alignment with the position 38a, the symbol "2" will be displayed in alignment with the position 38b, and so on.

If the arm 72 (FIGS. 1 and 4) is positioned so that the common element 66 of the multiple-position switch 65 (FIGS. 4 and 7) is connected to the contact pad 68b, the microprocessor will operate in the count mode instead of in the alignment testing mode. In the count mode, the microprocessor will select a number from among those symbolized by the numerical symbols on the card and will "remember" which number it has selected. In response to a first actuation of switch 82, the microprocessor will cause the loudspeaker to emit the selected number of audible tones. The child counts the tones and selects the symbol corresponding to the number of tones. He then moves the second member 24 (FIG. 1) until its pointer portion points to the numerical symbol corresponding to this number. If the child correctly performs this task, the second member will be in a position aligned with the numerical symbol for the number originally selected by the microprocessor. If the child does not correctly perform these tasks, the second member will be in a position which is not so aligned.

In response to a second actuation of the switch 82, the microprocessor will check and determine whether, at the time of such actuation, the second member 24 is in the correct position for the number previously selected. If it is, the microprocessor will cause the loudspeaker to emit the "first signal" indicative of correct performance and described above in connection with the alignment-testing mode of operation. If it is not, the "second signal", indicative of incorrect performance by the child will be emitted. In the event of incorrect performance by the child, the microprocessor will also actuate the one of the light-emitting diodes 100 which is aligned with the correct numerical symbol.

The toy is also usable in a randomizing mode. When the arm 72 (FIG. 1) is positioned so that the element 66 of switch 65 (FIG. 7) is connected to the contact pad 68c, the microprocessor 98 will operate in the randomizing mode. Upon actuation of the switch 82, the microprocessor will select a random one of the light-emitting diodes or visual indicators 100 and actuate the indicator so selected. The microprocessor will repeat this sequence of random choice and actuation each time the switch 82 is actuated. Thus, the toy can be used as a randomizing element in a game.

Preferably, when the toy is operated in the randomizing mode, a card surface (not shown) which includes a number of different symbols equal to the number of visual indicators is exposed on the front surface of the housing. Each one of these symbols is displayed in alignment with one of the visual indicators. Thus, the random selection and actuation of a visual indicator will signal the child to take action in accordance with the symbol which is aligned with the indicator so actuated. For example, each symbol may be a band of a particular color which corresponds to one of the colors on a multicolored game board. Actuation of the visual indicator or diode aligned with a particular color band on the card signals the child to advance a game piece to the next space of that color on the game board.

The loudspeaker 104 may be used to provide musical entertainment for the child. If the arm 72 (FIG. 1) of the mode selector switch 65 (FIG. 7) is positioned so that the common element 66 is connected to the contact pad 68d, the microprocessor will produce a series of audio-frequency electrical signals each time the switch 82 is actuated. The program of the microprocessor is so selected that the audio-frequency signals so produced will correspond to the notes in a musical melody. The loudspeaker 104 will convert these signals into an audible melody. Preferably, the microprocessor is programmed to produce different patterns of signals, corresponding to different melodies depending on the position of the second member 24 at the time the switch 82 is actuated. To enable the child to choose the desired melody, a card (not shown) is provided which incorporates symbols representative of the various melodies. These symbols are so arranged that each one will be displayed in alignment with the appropriate one of the positions 38 of the second set on the surface of the housing.

As described above, the child may choose the mode of operation of the toy by moving the arm 72 (FIG. 1) to an appropriate position, and by exposing an appropriate card face on the front of the housing. Preferably, each card face is marked with a mode symbol 124, and the positions of the arm are indicated on the housing by matching mode symbols 126. The symbols 124 and 126 are chosen so that the child can appropriately position the arm 72 by simply aligning it with a mode symbol 126 which matches the mode symbol 124 on the card surface which is exposed. For example, if the card surface 48a, appropriate to the alignment-testing mode, is exposed, mode symbol 124a (an S-shaped curve) will be visible. If the child moves arm 72 until it is aligned with matching mode symbol 126a (an S-shaped curve), the detection and signalling means within the toy will operate in the alignment-testing mode. By contrast, if the card surface 50b, (FIG. 8) appropriate to the count mode, is exposed, the mode symbol 124b (an asterisk) will be visible. The child would thus know to move the arm 72 into alignment with the mode symbol 126b on the housing (FIG. 1), and thereby cause the toy to operate in the count mode. Other symbols 126 are provided on the housing to indicate the appropriate arm positions for the randomizing mode and the music-generating mode.

As will be apparent from FIG. 1, the housing 10 is in the form of a man-like robot, and the members 22 and 24 constitute the arms of the robot. The pushbutton 92 forms the top of the robot's head. This arrangement is especially appropriate for use by young children; the child "shakes hands" with the robot when he adjusts the positions of the first and second members, and "pats" the robot on the head to provoke a response when he actuates the pushbutton 92.

The foregoing description of the preferred embodiment should be taken as merely illustrative, as numerous variations and combinations of the features described therein may be utilized without departing from the spirit of the present invention.

Merely by way of example, the detection and signalling means need not incorporate a microprocessor. As is well known to those skilled in the electronic arts, identical functions can be performed by discrete electronic components. Indeed, the detection and signalling means need not be electronically operated. Logically analagous mechanical or fluidic elements can replace the microprocessor, and mechanical or fluidic transducers can replace the loudspeaker and the light-emitting diodes. In any such arrangement, the switches referred to above would be replaced by appropriate clutches or valves, and the battery would be replaced by a source of mechanical energy.

Of course, some of the features described above may be omitted. For example, it would be possible to build a toy which would operate only in the alignment-testing mode. In such a toy, the mode selector arm and switch could be omitted.

Means for displaying symbols other than the interchangeable cards described above could be utilized. For example, the symbols could be simply marked on the front surface of the housing, or a liquid-crystal display could be provided.

Although the first and second members of the embodiment described above are slidably mounted to the housing, they could also be rotatably mounted to the housing. Of course, in such an embodiment, the positions of the members would lie in arcuate arrays rather than in straight rows along the sides of the device. Therefore, the display means would have to be modified to display the symbols in corresponding arcuate arrays in any such embodiment. Further, the pointer portions of the members could be omitted, as long as the configuration of the members is such that their alignment with the symbols can be readily discerned.

What is claimed is:

1. A toy comprising:
 (a) a housing;
 (b) a first member mounted on said housing and selectively movable between a plurality of discrete positions on said housing, such positions constituting a first set;
 (c) a second member mounted on said housing and selectively movable between a plurality of discrete positions on said housing, such positions constituting a second set, each position of said second set being associated with a position of said first set according to a predetermined pattern;
 (d) means for displaying a plurality of symbols of a first type and a plurality of symbols of a second type, each such symbol of said second type being logically related to one of said symbols of said first type, so that each one of said symbols of said first type is displayed on said housing in alignment with one of the positions of said first set and each one of said symbols of said second type is displayed on said housing in alignment with the position of said second set which is associated, according to said predetermined pattern, with the position of said first set in alignment with which is displayed the logically related one of said symbols of said first type;

(e) a switch which is selectively manually actuable independent of the positioning of said members; and (f) detection and signalling means operatively associated with said switch for detecting in an alignment-testing mode, the position of said first member and the position of said second member, and, responsive to actuation of said switch, emitting a first operator-perceivable signal if, at the time of such actuation, said first and second members are in associated positions, and emitting a second operator-perceivable signal different from said first operator-perceivable signal if, at the time of such actuation said first and second members are in non-associated positions, wherein said detection and signalling means includes output means for emitting a third operator-perceivable signal in the event that said switch is actuated while said first and second members are in non-associated positions, said third signal being indicative of the position of said first set at which said first member is located at the time of such actuation, and wherein said output means includes a plurality of visual indicators, one of said visual indicators being positioned in alignment with each one of the positions of said second set, and said third signal includes actuation of the visual indicator which is aligned with the appropriate position of said second set, and wherein said detection and signalling means includes means operable in a randomizing mode for pseudorandomly selecting one of said visual indicators and, in response to actuation of said switch, actuating the visual indicator so selected, said toy further comprising manually operable control means for causing said detection and signalling means to operate either in said alignment-testing mode or in said randomizing mode, as selected by the operator.

2. A toy comprising:
(a) a housing;
(b) a first member mounted on said housing and selectively movable between a plurality of discrete positions on said housing, such positions constituting a first set;
(c) a second member mounted on said housing and selectively movable between a plurality of discrete positions on said housing, such positions constituting a second set, each position of said second set being associated with a position of said first set according to a predetermined pattern;
(d) means for displaying a plurality of symbols of a first type and a plurality of symbols of a second type, each such symbol of said second type being logically related to one of said symbols of said first type, so that each one of said symbols of said first type is displayed on said housing in alignment with one of the positions of said first set and each one of said symbols of said second type is displayed on said housing in alignment with the position of said second set which is associated, according to said predetermined pattern, with the position of said first set in alignment with which is displayed the logically related one of said symbols of said first type;

(e) a switch which is selectively manually actuable independent of the positioning of said members; and (f) detection and signalling means operatively associated with said switch for detecting in an alignment-testing mode, the position of said first member and the position of said second member, and, responsive to actuation of said switch, emitting a first operator-perceivable signal if, at the time of such actuation, said first and second members are in associated positions, and emitting a second operator-perceivable signal different from said first operator-perceivable signal if, at the time of such actuation said first and second members are in non-associated positions, wherein said detection and signalling means is electrically operated, further comprising power source means for supplying electrical energy, means for momentarily electrically connecting said power source means to said detection and signalling means, and means for detecting any movement of said first member or of said second member or any actuation of said switch which may occur while said power supply means is electrically connected to said detection and signalling means and wherein said detection and signalling means includes timer means for maintaining a continuous electrical connection between said power source means and said detection and signalling means only until the expiration of a predetermined period of time after:
(a) the termination of said momentary connection, or
(b) the last such movement or actuation, whichever last occurs.

3. A toy as claimed in claim 2, wherein said detection and signalling means includes an electronic microprocessor, and said microprocessor also serves as part of said timer means.

4. A toy comprising:
(a) a housing;
(b) a first member mounted on said housing said selectively movable between a plurality of discrete positions on said housing, such positions constituting a first set;
(c) a second member mounted on said housing and selectively movable between a plurality of discrete positions on said housing, such positions constituting a second set, each position of said second set being associated with a position of said first set according to a predetermined pattern;
(d) means for displaying a plurality of symbols of a first type and a plurality of symbols of a second type, each such symbol of said second type being logically related to one of said symbols of said first type, so that each one of said symbols of said first type is displayed on said housing in alignment with one of the positions of said first set and each one of said symbols of said second type is displayed on said housing in alignment with the position of said second set which is associated, according to said predetermined pattern, with the position of said first set in alignment with which is displayed the logically related one of said symbols of said first type;

(e) a switch which is selectively manually actuable independent of the positioning of said members; and (f) detection and signalling means operatively associated with said switch for detecting in an alignment-testing mode, the position of said first member and the position of said second member, and, responsive to actuation of said switch, emitting a first operator-perceivable signal if, at the time of such actuation, said first and second members are in associated positions, and emitting a second operator-perceivable signal different from said first operator-perceivable signal if, at the time of such actuation said first and second members are in non-associated positions, wherein said housing is in the form of a man-like robot and said members are at least partially formed as the arms of the robot.

5. A toy as claimed in claim 2 wherein said detection and signalling means includes logic means operatively associated with said switch and operable in said alignment-testing mode for detecting the positions of said first member and said second member and producing in response to actuation of said switch, a first sequence of audio-frequency electrical signal if, at the time of such actuation said first and second members are in associated positions and producing a second sequence of audio-frequency electrical signals if, at the time of such actuation said first and second members are in non-associated positions, and said detection and signalling means also includes a loudspeaker electrically connected to said logic means, whereby said first and second operator-perceivable signals will each include a sequence of audible tones.

6. A toy as claimed in claim 5, wherein said logic means includes means operable in a music-generating mode for generating a plurality of further sequences of audio-frequency electrical signals, selecting a predetermined one of said further sequences according to the position of said second member and independently of the position of said first member and producing the sequence so selected in response to actuation of said switch, said toy further comprising manually operable control means for causing said logic means to operate either in said alignment-testing mode or in said music-generating mode as selected by the operator.

* * * * *